United States Patent [19]

Feen

[11] 4,057,890

[45] Nov. 15, 1977

[54] METHOD OF REMOVING BROKEN THREADED FASTENERS

[76] Inventor: Orlin J. Feen, 11102 Dale Ave., Warren, Mich. 48089

[21] Appl. No.: 754,238

[22] Filed: Dec. 27, 1976

Related U.S. Application Data

[60] Continuation-in-part of Ser. No. 620,040, Oct. 6, 1975, abandoned, which is a division of Ser. No. 465,288, April 29, 1974, abandoned.

[51] Int. Cl.² .................. B23P 19/02

[52] U.S. Cl. .................. 29/427; 85/1 L; 85/47

[58] Field of Search .................. 29/427, 426, 460; 85/1 L, 47, 45

[56] References Cited

U.S. PATENT DOCUMENTS

| | | | |
|---|---|---|---|
| 168,357 | 10/1875 | Uster | 85/45 |
| 2,121,197 | 6/1938 | Jackman | 29/427 UX |
| 2,288,864 | 7/1942 | Whitehead et al. | 85/47 X |
| 2,439,692 | 4/1948 | McKay | 29/427 X |
| 2,670,639 | 3/1954 | Flowers et al. | 29/427 X |
| 2,684,526 | 7/1954 | Hoover | 29/427 X |
| 2,744,311 | 5/1956 | Nipken et al. | 29/426 UX |

*Primary Examiner*—Charlie T. Moon
*Attorney, Agent, or Firm*—Krass & Young

[57] ABSTRACT

A method for removing broken fasteners so as to render the broken shank readily removable from a tapped hole in a machine part after a shear-type fracture of the fastener shank. In one illustrated form the fastener is a hexhead machine bolt having uniformly spaced slots cut into the shank from one end thereof to the other and filled with a lubricant material prior to installation. After a shear-type fracture a tool having axial projections at one end thereof mating with the slots is inserted into the interstices formed by the slots in the periphery of the sheared-off shank portion to force lubricant into the threads and to provide reaction surfaces to enable use of the tool to turn the shank portion out of the tapped hole. A second illustrated embodiment of the fastener shows an Allen head stud similarly slotted.

2 Claims, 4 Drawing Figures

METHOD OF REMOVING BROKEN THREADED FASTENERS

CROSS REFERENCE TO RELATED APPLICATIONS

This is a continuation-in-part of Ser. No. 620,040 filed Oct. 6, 1975, now abandoned, which was a division of Ser. No. 465,288 filed Apr. 29, 1974, now abandoned.

BACKGROUND OF THE INVENTION

1. Field of the Invention

This invention relates to fasteners for machine parts and more particularly to a method for facilitating the removal of sheared-off machine screw and bolt shanks from a machine part.

2. Brief Description of the Prior Art

The common problem of removing sheared-off machine parts such as engine blocks, metal castings and the like is well known to practically all persons concerned with machine maintenance and repair. Sheared-off machine screw and bolt shanks often occur as a consequence of extraordinary wear or abuse of a machine during use or transportation or as a result of over-torquing the fastener with the consequent shearing off of the head portion during inserting or removal. Where the environment includes high temperature or moisture conditions or both "freezing" of the threads commonly occurs due to formation of rust tending to lock the fastener in its bore, leading to such failures and exacerbating the removal problem. While coating the threads with lubricant has been practiced in the past, the quality of lubricant is usually inadequate to prevent drying out or other dissipation thereof over the course of time, such that such freeze-ups will still occur.

It is also well known that the removal of the sheared-off bolt or screw shank often presents an extremely difficult problem. One approach to the removal problem is to drill out the sheared-off shank portion. This technique often results in damage to the tapped hole within which the sheared-off shank resides with the consequential need for enlarging and retapping the hole. Other techniques are also somewhat difficult and are either destructive to the fastened machine part or substantially time consuming, or both. Accordingly, there exists a need for a solution to the problem of removing sheared-off screw and bolt shanks in an expeditious and non-destructive fashion, particularly in those environments tending to produce freeze-up of the fastener.

BRIEF DESCRIPTION OF THE INVENTION

In accordance with the present invention a fastener for machine parts may be sheared-off either flush with or below the surface of the fastened machine part and yet the remaining shank may be speedily and easily removed without destruction to the tapped hole within which the screw or bolt resides. In general, this is accomplished in the context of a fastener having an elongated cylindrical threaded shank for threaded engagement with a machine part, the shank having means such as a head, screw slot, or wrench socket formed at one end for receiving a turning tool such that the fastener may be threaded into a tapped hole, the method includes forming a plurality of slots in the shank outside diameter over substantially the entire length of the shank, filling the slots with a lubricant, and forcing the lubricant into the surrounding threads by insertion of a tool having complementarily shaped projections mating with the slots into the slots to pressurize the lubricant. The interaction of the tool and the slots provides reaction surfaces for removal of a portion of a shank from which the fastener end has been sheared away.

In the preferred form, the application of the present invention is to threaded bolts having an elongated shank, and a head, screw slot or wrench socket on one end so that it may be turned into a tapped hole in one or more abutting machine parts to be fastened. In addition, the slots formed in the shank take the form of a plurality of substantially straight slots or grooves entirely filled with lubricant and which extend along the outside of the shank and which thereby interrupt the thread over substantially the entire length of the shank. Accordingly, the shank may be sheared-off at any point along its length whereupon it will provide a plurality of slots into which a torquing tool having complementally extending projections may be inserted to thereby force the lubricant into the threads. The tool may itself comprise a shank portion of the same or lesser diameter as the tapped hole into which it must be inserted thereby to permit the reaching of a fastener which is sheared-off below the surface of the machine part into which the tapped hole was formed.

The lubricant material is preferably a paste-type stick lubricant and is used to fill the slots to substantially lengthen the removable life of the fastener.

The various features and advantages of the invention will be best understood from a reading of the following specification which is to be taken with the accompanying drawings.

DETAILED DESCRIPTION OF THE SPECIFIC EMBODIMENT

Figure 1:
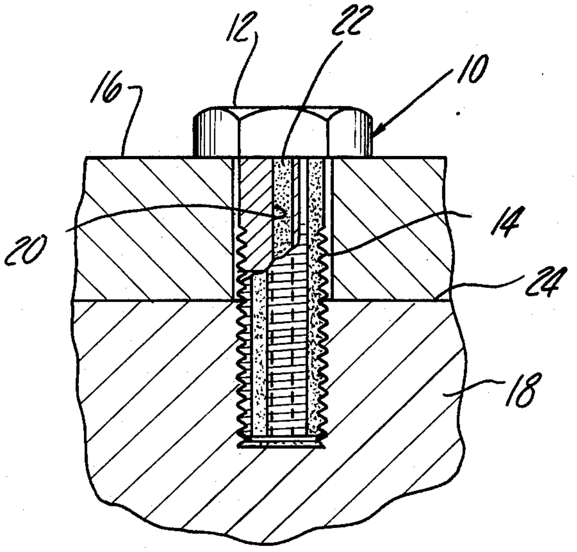
FIG. 1 is a side view of two facially abutting machine parts fastened together by means of a machine bolt having a hexagonal head and a shank formed in accordance with the method of the present invention.

FIG. 1 shows a fastener 10 in the form of a machine bolt having a hexagonal head 12 formed at one end of an elongate threaded shank 14. The bolt 10 is threaded into a tapped hole for the purpose of joining machine parts 16 and 18. Prior to such installation, the outside or threaded diameter of the shank 14 of fastener 10 is formed with a plurality of axially extending and uniformly circumferentially spaced slots substantially from the head 12 to the opposite end of the shank 14. The slots 20 are filled with a waterproof stick lubricant 22 which may be thought of as a semifluid material which provides a reservoir of lubricant for utilization upon removal as will be described below.

It is apparent that the apparatus of FIG. 1 poses a threat of shearing the shank 14 of the fastener 10 either directly under the head 12 or in the vicinity of the interface 24 between the machine parts 16 and 18. Of course, flaws or weak areas in the fastener 10 can give rise to shearing possibilities in other locations along the shank 14 as will be well known to those skilled in the art to which the invention pertains. Because the slots 20 are continuous over the length of bolt shank 14, lubricant filled external slots between the bolt and the tapped hole are presented regardless of the location of a shear fracture.

Figure 2:
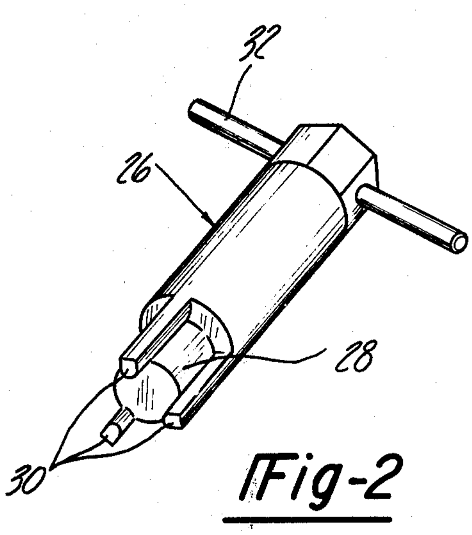
FIG. 2 is a perspective view of a removal tool for the bolt of FIG. 1.

FIG. 2 illustrates a tool which is suitable for use in the present method in removing a sheared-off portion of shank 14 from the machine parts 16 and 18 should such a failure of the fastener 10 occur. The tool 26 comprises an axially elongate cylindrical body or shank 28 having axially extending projections 30 at the lower end thereof and of such size and spacing as to be complemental to the slots 20 in the fastener 10 when sheared-off, for example, at the interface 24. A hole is drilled laterally through the shank 28 to receive a turning rod 32 such that, upon interfitting with the sheared-off shank 14 of fastener 10 a torque may be applied thereto.

Figure 3:
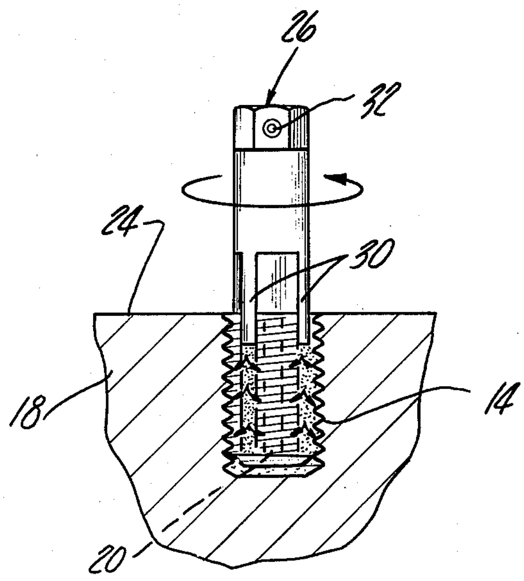
FIG. 3 is a side view of the removal tool as applied to a sheared-off bolt shank for the purpose of removing the shank from a machine part.

FIG. 3 illustrates the application of the tool 26 to the sheared-off shank portion 14. Again in FIG. 3 it is assumed that the fastener 10 has sheared off at the interface 24 leaving a shank portion which exhibits three uniformly spaced interstices or slots around the external surface or periphery of the shank 14. Since the slots 20 extend over the entire length of the shank 14 the shearing of the shank may occur at any point and the three spaced interstices will nevertheless be presented. The tool 26 is interfit with the sheared-off shank by inserting the projections 30 into the slots 20 forcing the lubricant 22 circumferentially into the intermediate threaded areas as the tool is advanced into the slots 20 to pressurize the lubricant. This process occurs continuously along the axial length of the slots to provide a very good distribution of the lubricant onto the threads. Thereafter the rod 32 is used to turn the tool and the sheared-off shank portion 14 out of the tapped hole in the machine part 18. The lubricant 22 thus greatly facilitates the removal operation.

Figure 4:
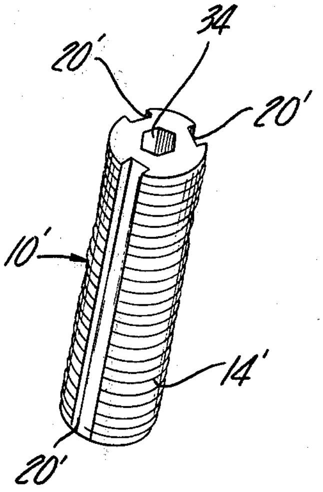
FIG. 4 is a perspective view of an alternative form of the invention in a machine stud having an Allen wrench socket.

FIG. 4 shows an alternative form of the invention comprising a headless stud 10' having a threaded shank 14' and three uniformly spaced slots 20' formed in the periphery of the shank and extending axially over the entire length thereof. The stud 10' is turned into a tapped hole by inserting an Allen head wrench into the socket 34 which is provided adjacent the upper end of the stud 10' as shown in FIG. 4. The stud 10' otherwise operates exactly in the same fashion as the machine bolt 10 of FIG. 1. It will be apparent that the reference characters have been primed in FIG. 4 to illustrate the correspondence thereof with the analogous or identical components shown in FIG. 1.

From the foregoing it is clear that the invention has application to threaded fasteners of the type having means at one end for torquing the fastener into a tapped hole, such means comprising either an external, enlarged head or an internal receptacle or socket of any one of various kinds. In addition, the method according to the present invention comprises external slots formed on the shank and extending over the entire length of the threaded portion of the shank, and depositing a quantity of lubricant into each slot. The slots thus act as a lubricant reservoir for forcing into the threads at removal as well as to present a suitable reaction surface for a torquing tool for removal of the sheared-off portion of the shank wherever the shear line might occur along the length of the shank. Variation of the practice of the invention will be apparent to those skilled in the art and accordingly for foregoing detailed description is not to be construed in a limiting sense. For example, while the lubricant has been described as a paste or stick type, a penetrating type lubricant could be used just prior to removal, although the preferred practice would be as described.

The embodiments of the invention in which an exclusive property or privilege is claimed are defined as follows:

1. A method of removing the broken shank portion of an externally threaded fastener of the type having a head portion adapted to provide a drive surface for installation of said shank portion into a mating threaded bore, the method comprising the steps of: forming a plurality of circumferentially spaced slots along the length of said shank, said slots being formed into the threaded portion of said shank fastener prior to installation thereof in said mating threaded bore; filling the slots with a lubricant material; forcing the lubricant material in each slot into the surrounding threads by inserting a tool having projections complementarily shaped to the slots into the slots; rotating said shank portion out of said bore by means of said tool, by engagement with said circumferentially spaced slots, whereby any portion of said fastener shank may be removed along which said circumferentially spaced grooves extend.

2. The method of claim 1 wherein the step of filling said slots with a lubricant material said material is added upon installation of said fastener in said mating threaded bore.

* * * * *